Oct. 17, 1950      B. CARLIN      2,525,861

DELAY SYSTEM FOR SUPERSONIC INSPECTION

Filed July 7, 1948

INVENTOR.
BENSON CARLIN
BY
Joseph H. Lipschutz
ATTORNEY

Patented Oct. 17, 1950

2,525,861

UNITED STATES PATENT OFFICE 2,525,861

DELAY SYSTEM FOR SUPERSONIC INSPECTION

Benson Carlin, New York, N. Y., assignor to Sperry Products, Inc., Hoboken, N. J., a corporation of New York Application July 7, 1948, Serial No. 37,405

2 Claims. (Cl. 73—67)

This invention relates to the supersonic inspection of materials, particularly in those cases where the flaw to be detected lies near the entering surface of the part to be detected or where small thicknesses of material are to be measured. More particularly, the invention relates to a supersonic inspection system wherein supersonic pulses generated by means such as an electroacoustic transducer including a quartz crystal are sent into the part to be inspected and the reflection of said pulses or wave trains from interior flaws or from the opposite surface of the material are detected. The time interval between the transmission of the pulse and the reception of its reflection from a defect or opposite bounding surface is a measure of the distance of the reflecting surface below the entering or transmission surface. In the case of reflecting surfaces which lie close to the sending crystal, as for instance in the region within one-half inch of the entering surface of the object, the reflected waves will start arriving at the sending point before the transmission of the wave train has ceased. This renders it difficult to distinguish the reflection from the transmitted pulse. Another reason for the difficulty in detecting reflecting surfaces lying close to the transmission surface is the fact that the amplifier associated with the receiving or detecting means is overloaded by the transmission of the wave train and requires some time for recovering its sensitivity after the pulse transmission has ceased. In order to make it possible to detect reflecting surfaces lying close to the transmission surface, it has heretofore been proposed to utilize mechanical time delay members interposed between the sending transducer and the entering surface of the object under test. This will increase the time of travel of the pulse from the transducer to the reflecting surface and from the reflecting surface back to the transducer to such extent that the transmission of the pulse will have ended before the reflection starts arriving at the sending point and thus separation of the transmitted pulse and the reflected pulse will be achieved. Heretofore it has been proposed to employ for this purpose a mechanical time delay member made of metal, but the difficulty which such practice encountered resided in the fact that the metal at its contact surface with the object under test formed an interface which itself reflected the transmitted pulse and thus there arrived at the sending point an additional reflection which tended to obscure the separation which would otherwise be effected between transmitted pulse and reflection from a defect within the object or from the back surface of the object.

It has been found that the employment of a mechanical time delay of a material having the properties of plastic such as methyl methacrylate avoided the difficulty noted above when such plastic was coupled to the material under test through an oil film. In such case, it was found that there was little or no back reflection from the interface between the plastic and the material under test. Here, however, another difficulty was encountered, namely, that it was difficult to transmit longitudinal waves through the plastic material. Blocks of such material as thin as ⅛ inch were found to produce large attenuating effects which made it difficult to transmit longitudinal waves in sufficient strength to inspect the object under test.

It is, therefore, the principal object of this invention to provide a method and means for testing material by way of an intermediate time delay member having the properties of plastic, but which nevertheless permit the transmission into the object under test of longitudinal waves in any desired strength.

It is a further object of this invention to provide an intermediate time delay member which will offer greater time delay for any given dimension of member than was heretofore possible by methods previously used.

Further objects and advantages of this invention will become apparent in the following detailed description thereof.

In the accompanying drawings.

Figure 1:
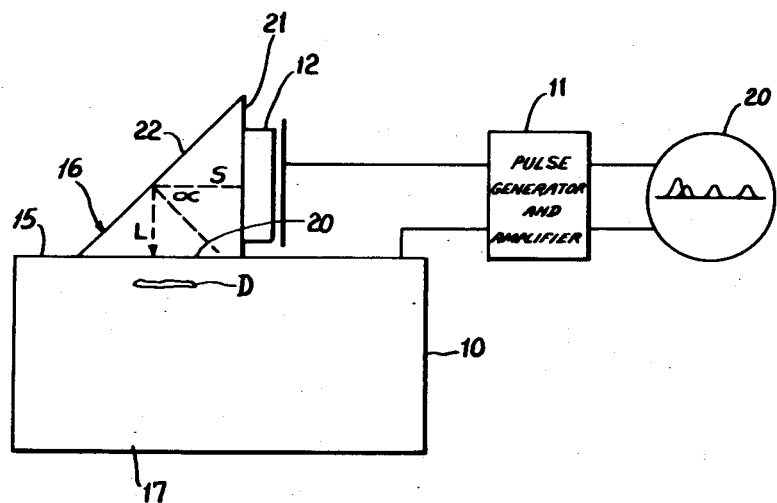
Fig. 1 is a front elevation and wiring diagram illustrating one form of this invention.

Referring to Fig. 1 of the drawings, there is shown an object or workpiece 10 which is to be inspected for defects or which is to be measured for thickness. For this purpose a pulse generator 11 is designed to generate pulses or wave trains at periodic intervals, which wave trains are designed to be impressd upon an electroacoustic transducer such as crystal 12 of a type to be described hereinafter, which crystal will transform the electric oscillations into mechanical vibrations and apply the same to the entering or transmission surface 15 of object 10 by way of an intermediate mechanical time delay member 16 of a design and shape to be described hereinafter. Each pulse of longitudinal wave is designed to travel into the workpiece 10 and be reflected by any reflecting surface such as a defect D or the opposite or backwall 17 of object 10. The pulse thus reflected by defect D or wall 17 is transmitted through intermediate member 16 to the crystal 12 which will transform the mechanical oscillations into electric oscillations which, after being amplified by the amplifier which may be part of the pulse generator, are impressed upon an oscilloscope 28 in which there is a generated sweep 21. The voltages impressed on the oscilloscope by the transmitted pulse and the reflections thereof will be indicated by deviations of the pulse as shown at A, and B, C, or E, as shown in Fig. 2.

Figure 2:
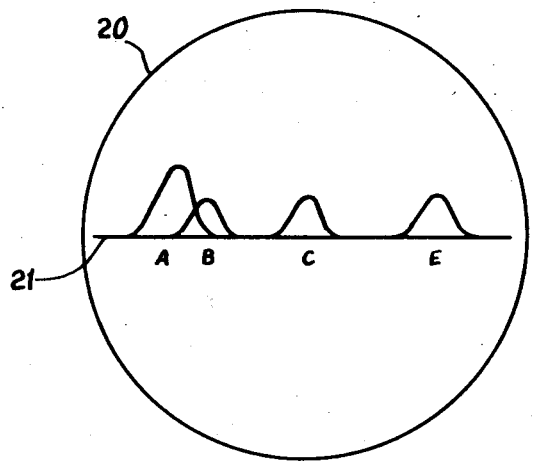
Fig. 2 is an enlarged front elevation of an oscilloscope face illustrating the theory of this invention.

Referring to Fig. 2 it will be seen that if there is no time delay between the transducer and the object, the reflection B from defect D will begin arriving before the pulse A has ceased and the two indications will interfere so that it will be difficult to determine whether there is a reflection or not. If a time delay in the form of an intermediate member is employed, and the intermediate member is a rectangular piece and crystal 12 transmitted longitudinal waves directly therethrough, there would be a time delay as indicated at C which shows that there is a time interval between A and C, most of this interval being contributed by the mechanical intermediate time delay member. However, as explained in the introduction hereto, in the case where material having the properties of plastic is employed, it is difficult to transmit longitudinal waves through such material in sufficient quantity to enable object 10 to be inspected. Therefore, I have provided the following solution.

I employ an intermediate member 16 having one bounding surface 20 in engagement with face 15 and having the crystal in engagement with another bounding surface 21. Furthermore, crystal 12, instead of being an X-cut crystal which generates longitudinal waves, is a Y-cut crystal which generates shear waves. Shear waves have no difficulty in entering material having the properties of a plastic and such waves can be impressed with high power. A third bounding surface 22 of member 16 is inclined with respect to the direction of travel of the shear waves at an angle α which is equal to, or greater than, the critical angle at which the shear waves will be converted into longitudinal waves, as shown, and these longitudinal waves will enter the material 10 with substantially no loss. The angular relation of the third bounding surface 22 with respect to the other two bounding surfaces is such that a wave entering through the first surface 21 will strike the surface 22 at an angle of incidence whose reflection will fall between the ends of the second surface 20 in contact with the object. Preferably the angular relation of the third surface 22 with respect to the other two surfaces is such as to cause the reflected wave to strike the second surface and the object normally. The surface 20 is arranged to intercept the longitudinal waves. In other words, while it is difficult to transmit longitudinal waves into a material having the properties of plastic, there is no reluctance to transforming shear waves into longitudinal waves within such material. Thus, longitudinal waves with any desired power may be transmitted by way of the plastic-like material under test. In addition, because shear waves travel with about one-half the speed of longitudinal waves, it will be seen that an appreciable greater time delay can be obtained with an intermediate member by this method than could be obtained with an intermediate member of equivalent size utilizing only longitudinal waves. Thus, while the use of an intermediate member of a given size employing only longitudinal waves would give a time delay indicated by the interval between A and C in Fig. 2, by the method here described employing shear waves, the same size intermediate member will give a separation indicated between A and E in Fig. 2. Where the expression "a material having the properties of a plastic" has been employed above, it is the intention to describe any material whose acoustic impedance is less than that of metal, contains no separation of grain (is homogeneous) and will sustain shear waves. An example of such material is methyl methacrylate.

Having described my invention, what I claim and desire to secure by Letters Patent is:

1. An apparatus for transmitting longitudinal waves into an object to be inspected, comprising an intermediate member having the properties of a plastic material and having a bounding surface in engagement with the object, a shear wave generating means adapted to engage another bounding surface of the intermediate member to transmit shear waves into the member, said member having a third bounding surface disposed at an angle to the direction of travel of the shear waves, said angle being at least equal to the critical angle for transforming the shear waves into longitudinal waves, and said first bounding surface being positioned to intercept the longitudinal waves.

2. In a device for the supersonic inspection of an object, a pulse generator, a Y-cut crystal actuated by the pulses from said generator and adapted to generate shear waves, an intermediate member of plastic material interposed between the crystal and the object, said crystal being in engagement with one surface of the intermediate member, said member having a second surface thereof positioned to intercept the shear waves, said second surface being disposed at an angle at least equal to the critical angle for transforming shear waves into longitudinal waves, said member having a third surface in engagement with the object and positioned to intercept the longitudinal waves.

BENSON CARLIN.

REFERENCES CITED

The following references are of record in the file of this patent:

UNITED STATES PATENTS

| Number | Name | Date |
|---|---|---|
| 2,439,130 | Firestone | Apr. 6, 1948 |
| 2,467,301 | Firestone | Apr. 12, 1949 |